Patented Aug. 17, 1943

2,327,053

UNITED STATES PATENT OFFICE 2,327,053

PRODUCTION OF HYDROXY ETHERS

Kenneth E. Marple, Edward C. Shokal, and Theodore W. Evans, Oakland, Calif., assignors to Shell Development Company, San Francisco, Calif., a corporation of Delaware No Drawing. Application November 18, 1939, Serial No. 305,166

10 Claims. (Cl. 260—611)

This invention relates to a process for the production of hydroxy ethers. More particularly the invention is concerned with a process wherein epoxide compounds are reacted with organic hydroxy compounds in the presence of certain highly active metal halide catalysts, the reaction yielding the valuable hydroxy ethers.

It has been known to react olefine oxides with alcohols under the influence of elevated temperature without the use of a catalyst, as well as with certain catalysts which are claimed to increase the rate of reaction which is ordinarily very slow in the absence of a catalyst. A variety of substances have been proposed as catalysts for the reaction, including acid-acting compounds such as sulphuric acid, boric acid and some fluorine-containing acids, as well as some basic-acting and substantially neutral compounds as alkali metal alcoholates, alkali metal salts of the lower fatty acids, normal sulphates of polyvalent metals, dialkyl sulphates, hydrosilicates, tertiary amines and certain metal oxides. It has also been proposed to react olefine oxides with phenols to produce aryl alkyl hydroxy ethers. Catalysts recommended for this reaction include the oxides of certain metals, tertiary amines, alkali metal alcoholates and alkali metal phenolates. Although these substances do accelerate the reaction to various degrees, it has now been found by us that certain metal halides are more active and considerably more suitable as catalysts.

An object of the present invention is to provide a process for producing hydroxy ethers by reacting an epoxide compound with an organic hydroxy compound in the presence of a catalyst markedly superior to those known heretofore.

Another object of the invention is to provide a practical and economical process which is adapted to the technical scale production of hydroxy ethers by reaction of epoxide compounds with organic hydroxy compounds.

These and other objects of the invention may be accomplished by the process of the invention which in its broad aspects comprises reacting epoxide compounds such as alkylene oxides and substitution products thereof with organic hydroxy compounds, wherein the hydroxy group may be linked to an aliphatic carbon atom as in alcohols or to an aromatic carbon atom as in phenols, and effecting the reaction in the presence of the metal halide catalysts. The reaction involved in the production of the hydroxy ethers may be represented by the following general equation:

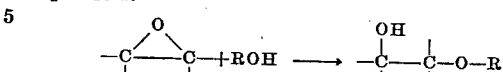

wherein

designates the reaction group of the epoxide compound, ROH designates the organic hydroxy compound, and

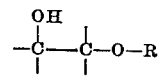

designates essential groups of the product, a hydroxy ether. We have found that this reaction can be made to proceed at a practical, rapid rate with a resultant high yield of the desired hydroxy ether if it is conducted in the liquid phase in the presence of a stannic halide, antimony pentahalide, aluminum halide, zinc halide or ferric halide. This group of metal halides, especially stannic halide and antimony pentahalide, and more particularly, stannic chloride and antimony pentachloride, possess some peculiar property, not at present understood, which enables them to greatly increase the rate of the liquid phase reaction between epoxide compounds and organic hydroxy compounds.

The high catalytic activity of this group of catalysts makes them attractive to employ in the process since only small amounts are required to effect a substantially complete reaction in a short time. The actual amount of catalyst needed in the process however will be dependent upon a number of factors including the particular metal halide used, the particular reactants employed, the water content of the reaction mixture and the operating conditions employed. In general, the larger the amount of catalyst present in the reaction mixture, the more rapid will be the reaction. Satisfactory results may be obtained ordinarily with catalyst concentrations in the reaction mixture of from a few tenths of one per cent to several per cent. If advantageous and desired, more or less than this amount may be used.

The metal halide catalysts employed in the process are all hydrolyzable compounds when in the presence of water. Furthermore, their catalytic activity is considerably impaired when they are in a hydrolyzed condition and larger amounts of catalyst are required to effect the reaction when the reactants contain appreciable amounts of water as compared to when they are substantially dry. Also, the hydrogen halide liberated by the hydrolysis of the metal halide may combine with the epoxide compound to form halohydrin types of by-products which may prove troublesome to remove from the desired product. It is therefore preferable for the reactants used in the execution of the invention to be in a substantially anhydrous condition.

The epoxide compound which may be used in the process are the compounds which contain not more than four atoms in the heterocyclic epoxide ring, i. e. compounds which contain 1.2- and 1.3-oxide groups. Representative compounds include the alkylene oxides such as ethylene oxide, propylene oxide, butene-1 oxide, butene-2 oxide, isobutylene oxide, trimethylene oxide, butadiene monoxide, butadiene dioxide, cyclopentylene oxide, styrene oxide, etc. as well as substituted alkylene oxides which contain various substituent groups in addition to the epoxide group like the epihalohydrins such as epichlorhydrin, epibromhydrin, alpha methyl epichlorhydrin, beta methyl epichlorhydrin, alpha alpha' dimethyl epibromhydrin, etc.; nitro epoxide compounds such as nitro glycide, beta ethyl nitro glycide, nitro styrene oxide, etc.; epoxide ethers such as methyl glycidyl ether, isopropyl glycidyl ether, secondary butyl beta methyl glycidyl ether, cyclopentyl glycidyl ether, phenyl glycidyl ether, etc.; epoxide thioethers such as ethyl glycidyl thioether, cyclohexyl alpha methyl thioether, tolyl glycidyl thioether, etc.; epoxide esters such as glycidyl acetate, glycidyl propionate, beta propyl glycidyl naphthenate, glycidyl benzoate etc. and the like.

Any hydroxy-containing organic compound containing either an alcoholic hydroxy group or a phenolic hydroxy group may be reacted with the epoxide compound according to the process of this invention, but it is preferable to use one which contains no other groups, other than the hydroxy group, reactive with the epoxide group. There may be used either monohydric or polyhydric alcohols as well as monohydric or polyhydric phenols. The alcohols may be either primary, secondary or tertiary in character and may be saturated or unsaturated as well as substituted with various substituents. Examples of representative monohydric alcohols include such alcohols as methyl, ethyl, isopropyl, normal butyl, secondary butyl, tertiary butyl, lauryl, cetyl, allyl, crotyl, propargyl, cyclopentyl, cyclohexyl, cyclopentenyl, benzyl, phenyl ethyl, furfuryl, etc. Among the polyhydric alcohols there may be mentioned ethylene glycol, propylene glycol, isobutylene glycol, trimethylene glycol, cyclopentene glycol, styrene glycol, glycerine, beta methyl glycerine, alpha phenyl glycerine, erythritol, pentaerythritol, mannitol, sorbitol, etc. Substituted alcohols include such compounds as ethylene chlorhydrin, propylene bromhydrin, glycerine monochlorhydrin, glycerine dichlorhydrin, dichloro tertiary butyl alcohol, methyl glycerol ether, isopropyl glycerol thioether, methyl ethylene glycol ether, phenyl glycerol ether, diisopropyl glycerol ether, secondary butyl beta methyl glycerine ether, ethylene glycol monoacetate, trimethylene glycol monobutyrate, tertiary butyl glycerol ether monoacetate, isopropyl beta methyl glycerine thioether monobenzoate, ethyl lactate, dinitroglycerine, etc. The phenolic compounds or phenols and substituted phenols include the hydroxy compounds like phenol, the cresols, the xylenols, ethyl phenol, tertiary butyl phenol, resorcinol, catechol, orcinol, pyrogallol, phloroglucinol, eugenol, creosol, chlorophenol, bromocresol, trinitrophenol and the like. Less preferred hydroxy compounds are those which contain in addition to the hydroxy group, such groups as amino groups, carboxyl groups, carboxylic acid groups, etc. which are also reactive with the epoxide compound in competition with the hydroxy group.

Compounds containing both an epoxide group and a hydroxy group may also be used in the process such as glycidol, beta methyl glycidol, hydroxy styrene oxide and the like. These substances yield products of the type of polyglycerols and are often resinous in character.

The molecular proportion of the hydroxy compound employed in the process is preferably in considerable excess of the epoxide compound. Ordinarily a molecular ratio of at least two of hydroxy compound to one of the epoxide compound is used. High yields of the desired hydroxy ether may be obtained when the reaction mixture contains three to five mols of hydroxy compound per mol of epoxide compound. The excess hydroxy compound remaining after the reaction may be recovered, by distillation, for example, and returned to the process for the reaction with additional epoxide compound. If it is desired, however, to produce secondary or higher reaction products rather than the primary combination product of one molecule of epoxide compound with one molecule of hydroxy compound, the ratio may be decreased so that the reaction of the primary hydroxy ether first formed with additional epoxide compound to give secondary or higher products may be favored.

The reaction is conducted at temperatures of from about —50° to 250° C. Cooling the mixture of reactants so that it is below room temperature, say, from about 10° to —50° C., when the metal halide catalyst is added thereto is usually advantageous since such a procedure has an effect on the amount of catalyst which must be used to produce a desired reaction rate. In general, this procedure considerably reduces the amount of catalyst necessary as compared to when the catalyst is added to the reaction mixture at ordinary or elevated temperatures and is of importance in the technical scale manufacture of the hydroxy ethers wherein it is desirable to keep the catalyst consumption at a minimum. The reaction begins immediately upon contact of the reactants with the catalyst and while it may initially be slow at the low temperatures, it soon becomes vigorous with a resultant increase in temperature of the reaction mixture. In general, the reaction may be completed by heating the reaction mixture at its normal boiling temperature except when a low boiling reactant such as ethylene oxide, propylene oxide, etc., is employed. In such cases where higher temperatures than the normal boiling temperature of the reaction mixture are used, it is desirable to maintain a pressure on the reaction mixture at least equal to the total vapor pressure of the mixture at the operating temperature, since the reaction occurs in the liquid phase.

The process of the invention may be executed in a variety of manners and is adaptable to batchwise, intermittent and continuous operation. For example, a mixture of the epoxide compound and the hydroxy compound is prepared and may be cooled to a temperature below ordinary room temperature. To this mixture the metal halide catalyst is then added, and the mixture may be heated gently. The reaction between the epoxide compound and the hydroxy compound is exothermic so that the reaction may become sufficiently rapid to evolve a considerable amount of heat which may raise and maintain the temperature at the boiling point for a period of time without further application of external heat. Owing to the spontaneous and possibly violent character of the reaction when using the metal halide catalysts, it may be desirable to apply cooling to the reaction mixture, after initiating the reaction by heating, so as to control it. The reaction may be allowed to proceed satisfactorily with the reaction mixture contained in a vessel fitted with heating and cooling means as well as suitable condensing means, such as a reflux condenser, for condensing and returning any vapors of reactants which may be evolved. In order to assure completion of the reaction, the reaction mixture is heated or boiled for a period of time during which samples may be withdrawn and analyzed to determine when the reaction is substantially complete. At the completion of the reaction the catalyst may, if desired, be neutralized and destroyed by treatment with a basic-acting substance such as sodium carbonate although this is not imperative. The unreacted components of the reaction mixture and the products of the reaction may be separated in any suitable manner such as distillation.

An alternative method of operation is to add the catalyst to the hydroxy compound and subsequently introduce the epoxide compound either as an entirety or in portions into the mixture. In general, it is inadvisable to add the catalyst to the epoxide compound in the absence of the hydroxy compound. This procedure is to be avoided because of the tendency of the epoxide compound to react with itself in the presence of the catalyst and form less valuable and usually undesirable by-products.

Continuous operation may be achieved by passing the mixture of reactants and catalyst through a tubular reactor, for example, at such a rate that substantially complete reaction is obtained during the time of residence of the mixture therein. The reactor is heated by any suitable means so that the mixture is at the desired temperature and pressure may be applied if necessary to keep the reactants liquid.

The invention is more clearly indicated by the following examples which are given for illustrative purposes only.

*Example I*

A mixture of about 6 mols of epichlorhydrin and 24 mols of isopropyl alcohol was cooled to 8° C. and about 0.012 mol of stannic chloride added thereto. The mixture was heated gently, whereupon it came to a boil spontaneously and it was then refluxed under a reflux condenser for approximately one-half hour, after which time the reaction was complete. About 2.5 gm. of sodium carbonate was added to destroy the stannic chloride. The unreacted alcohol was recovered from the mixture by distillation at atmospheric pressure, and the pressure then reduced to about 10 mm. to obtain the product. The desired isopropyl glyceryl chlorhydrin ether boiling at about 70–73° C. at 10 mm. was secured in a yield of approximately 93%.

*Example II*

A mixture of about 6 mols of epichlorhydrin and 24.3 mols of methyl alcohol was cooled in an ice bath. To the mixture was added about 0.036 mol of stannic chloride, and the mixture boiled. Upon completion of the reaction, no basic substance was added to destroy the catalyst. The excess alcohol was removed by distillation at atmospheric pressure and the product recovered by distillation in vacuo. A yield of about 88.4% of methyl glyceryl chlorhydrin ether was obtained which boiled at about 63–66° C. at 10 mm.

*Example III*

Using a ratio of about four mols of isopropyl alcohol and one mol of isobutylene oxide to which was added 0.01 mol of stannic chloride, the reaction mixture heated to boiling spontaneously upon addition of the catalyst. After the reaction, the stannic chloride was neutralized by adding about 6 gms. of sodium carbonate with 500 cc. of water, and the product distilled. The primary product boiling at 42 to 46° C. at 10 mm., was obtained in a 43.8% yield and had the probable structure: $(CH_3)_2CHOC(CH_3)_2CH_2OH$. A secondary product probably resulting from the isobutylene oxide reacting with the primary product was obtained in 10.9% yield and had the probable structure:

*Example IV*

A mixture of about 12.45 mols of methyl alcohol and 3.11 mols of isopropyl glycidyl ether was chilled, and to it was added about 0.013 mol of stannic chloride. The mixture was heated gently whereupon a vigorous reaction ensued which caused the mixture to boil for about 8 minutes, after which heat was applied and the mixture boiled for an additional 15 minutes. The catalyst was neutralized with 2.5 gms. of sodium carbonate dissolved in 10 cc. of water. Distillation of the mixture yielded about 83.9% of isopropyl methyl glycerol diether boiling at about 74 to 77° C. at 10 mm.

*Example V*

A reaction mixture consisting of about 1.5 mols of para tertiary amyl phenol, 0.5 mol of epichlorhydrin and 0.005 mol of stannic chloride was heated at 95° C. for approximately 9 hours. Isooctane was then added and the greater part of the excess phenol crystallized out. The residue was then vacuum distilled and the cut boiling from about 140 to 154° C. at 0.5 mm. was analyzed. The analysis indicated the presence of 12.95% chlorine, 66.05% carbon and 8.6% hydrogen. The compound

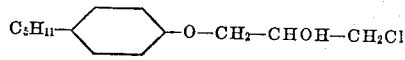

theoretically contains 14.0% chlorine, 65.5% carbon and 8.3% hydrogen.

*Example VI*

A mixture of about 2 mols of isopropyl alcohol and 0.5 mol of epichlorhydrin was cooled and 0.01 mol of aluminum chloride added thereto. The mixture was refluxed for about 17 hours after which a sample was taken and analyzed. The analysis showed the reaction was complete.

Example VII

A mixture of the same quantity of reactants as in Example VI was chilled and about 0.01 mol of antimony pentachloride added. Upon warming to about room temperature, a vigorous reaction set in bringing the mixture rapidly to refluxing temperature. The violence of the reaction was controlled by ice cooling and after the spontaneous reaction subsided, the mixture was heated to reflux. After a total reaction time of about 15 minutes an analysis showed that the reaction was complete.

Example VIII

About 4 mols of ethyl alcohol and 1 mol of epichlorhydrin were mixed and 0.02 mol of zinc chloride added to the mixture. After boiling for about 21 hours, an analysis of a sample of the reaction mixture indicated that the desired reaction had occurred.

Example IX

A mixture of about 2.0 mols of isopropyl alcohol and 0.5 mol epichlorhydrin was chilled and about 0.005 mol of sublimed ferric chloride added. The mixture was then heated and boiled for about 6½ hours after which a sample of the mixture was analyzed and the reaction found to be complete.

Example X

About 0.0025 mol stannic chloride was added to a cooled mixture consisting of about 2.0 mols of secondary butyl alcohol and 0.5 mol of epichlorhydrin. The mixture was heated and refluxed for about 17 hours. An analysis showed that the reaction was complete at the end of this time.

Example XI

A mixture of 2.0 mols of tertiary octyl alcohol and 0.5 mol of epichlorhydrin was chilled and about 0.005 mol of stannic chloride added. The mixture was boiled and after several hours, a test on the reaction mixture indicated that the reaction was substantially complete.

Example XII

A mixture containing about 3 mols of ethyl alcohol per mol of epichlorhydrin and 0.3% zinc chloride was fed through a continuous reactor which consisted of a copper coil submerged in an oil bath. The temperature of the oil bath was maintained at approximately 200° C. and the reaction mixture forced through the coil against an outlet pressure of about 500 pounds per square inch. The contact time was about 16 to 17 minutes. Distillation of the product gave about 90% yield of ethyl glycerol monochlorhydrin ether.

Example XIII

About 94 gms. of ethylene oxide were dispersed through a sintered glass plate into a mixture of about 5.7 mols of cyclopentanol and 0.01 mol of stannic chloride maintained at a temperature of from 100 to 140° C. over a period of three and one-half hours. Approximately 10 gms. of unreacted ethylene oxide were collected in a cold trap; hence 84 gms. of ethylene oxide were absorbed. Four gms. of sodium carbonate were added and the mixture fractionated. About 4.19 mols of cyclopentanol were recovered and a yield of about 67% of monocyclopentyl ether of ethylene glycol was obtained. The product had a boiling point of 82.0° C. at 10 mm. pressure and the following values for density and refractive index: $d_4^{20}=0.994$ and $n_D^{20}=1.456$. A secondary reaction product was obtained in a 23% yield. It was identified as the monocyclopentyl ether of diethylene glycol.

Example XIV

The monocyclopentyl ether of glycerine alpha-monochlorhydrin was prepared by reacting a mixture of about 6 mols of cyclopentanol, 2 mols of epichlorhydrin and 0.01 mol of ferric chloride at reflux temperature for 30 hours. At the end of this time there was added sodium carbonate in the amount of 4 gms. and the mixture was fractionated. A yield of 47% of the monocyclopentyl ether of glycerine alpha-monochlorhydrin was obtained with a recovery of 3.96 mols of unreacted cyclopentanol. The properties of the ether are as follows: B. P. =108° C. at 8 mm.; $d_4^{20}=1.116$, and $n_D^{20}=1.475$.

The hydroxy ethers prepared according to the process are very valuable and useful substances. They may be used as solvents and extractants in a variety of industrial applications, as intermediates in the preparation of various chemicals, as ingredients of insecticide and fungicide compositions and in many other miscellaneous applications. The novel monocyclopentyl ethers of polyhydric alcohols, illustrated by Examples XIII and XIV, are a particularly useful class of compounds which may be used for the synthesis of various compounds owing to the presence of the cyclopentyl group in these compounds. The cyclopentyl group, quite unexpectedly from knowledge of homologous compounds, in these compounds make them especially suited for preparation of various pharmaceutical and medicinal compounds and compositions.

We claim as our invention:

1. A monocyclopentyl ether of ethylene glycol.
2. A monocyclopentyl ether of a dihydric alcohol.
3. A monocyclopentyl ether of glycerine alpha monochlorhydrin.
4. A monocyclopentyl ether of a halo-substituted polyhydric alcohol.
5. A monocyclopentyl ether of a polyhydric alcohol.
6. A process for the production of a monocyclopentyl ether of ethylene glycol which comprises reacting ethylene oxide with cyclopentyl alcohol in the presence of a catalyst selected from the group consisting of stannic halides, antimony pentahalides, aluminum halides, zinc halides, and ferric halides.
7. A process for the production of a monocyclopentyl ether of a dihydric alcohol which comprises reacting an alkylene oxide with cyclopentyl alcohol in the presence of a catalyst selected from the group consisting of stannic halides, antimony pentahalides, aluminum halides, zinc halides, and ferric halides.
8. A process for the production of a monocyclopentyl ether of glycerine alpha monochlorhydrin which comprises reacting epichlorhydrin with cyclopentyl alcohol in the presence of a catalyst selected from the group consisting of stannic halides, antimony pentahalides, aluminum halides, zinc halides, and ferric halides.
9. A process for the production of a monocyclopentyl ether of a halo-substituted polyhydric alcohol which comprises reacting an epihalohydrin with a cyclopentyl alcohol in the presence of a catalyst consisting of a metal halide.

10. A process for the production of a monocyclopentyl ether of a polyhydric alcohol which comprises reacting an epoxide compound with a cyclopentyl alcohol in the presence of a catalyst consisting of a metal halide.

KENNETH E. MARPLE.
EDWARD C. SHOKAL.
THEODORE W. EVANS.